Jan. 21, 1947.   F. MASSA   2,414,695
APPARATUS FOR LOCATING A SOUND SOURCE
Original Filed Oct. 31, 1939   2 Sheets-Sheet 1
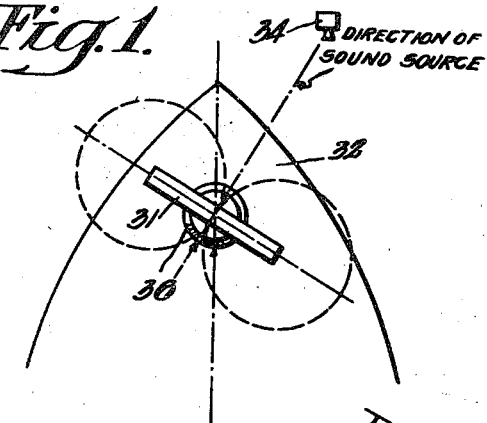
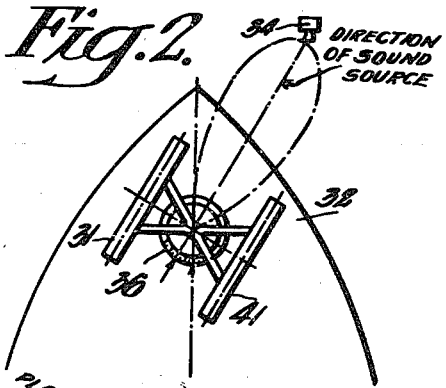
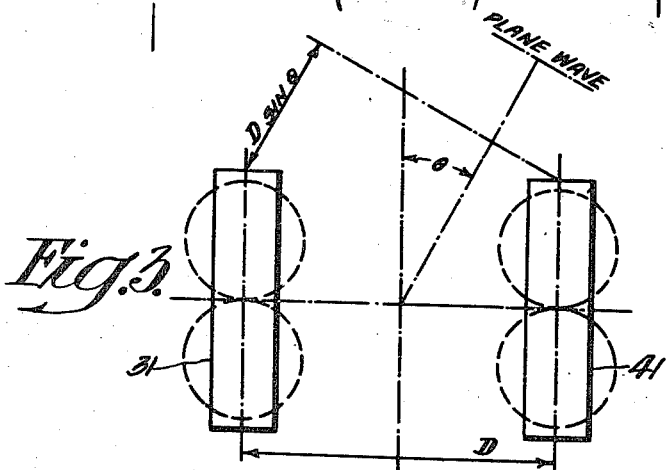
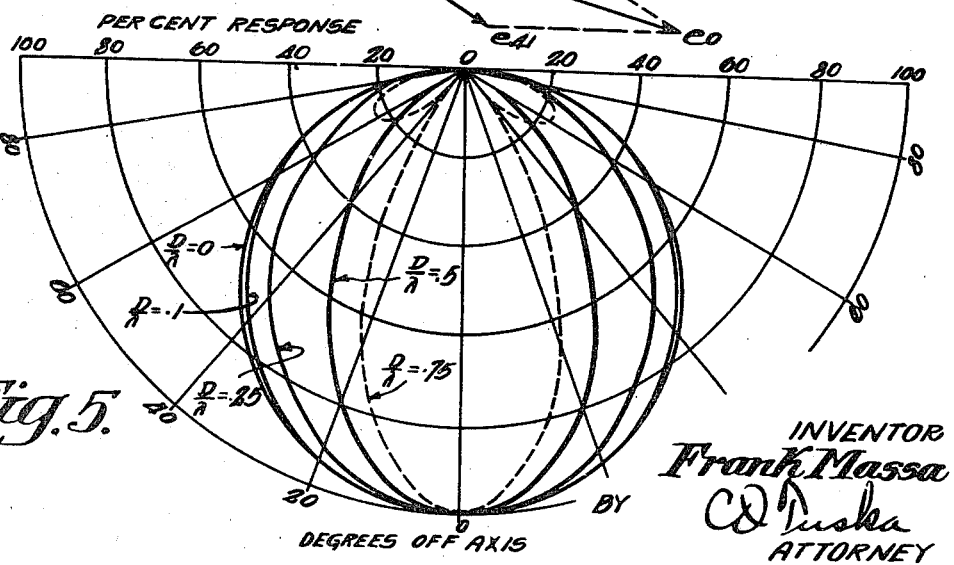
INVENTOR
Frank Massa
BY
ATTORNEY Jan. 21, 1947. F. MASSA 2,414,695
APPARATUS FOR LOCATING A SOUND SOURCE
Original Filed Oct. 31, 1939 2 Sheets-Sheet 2
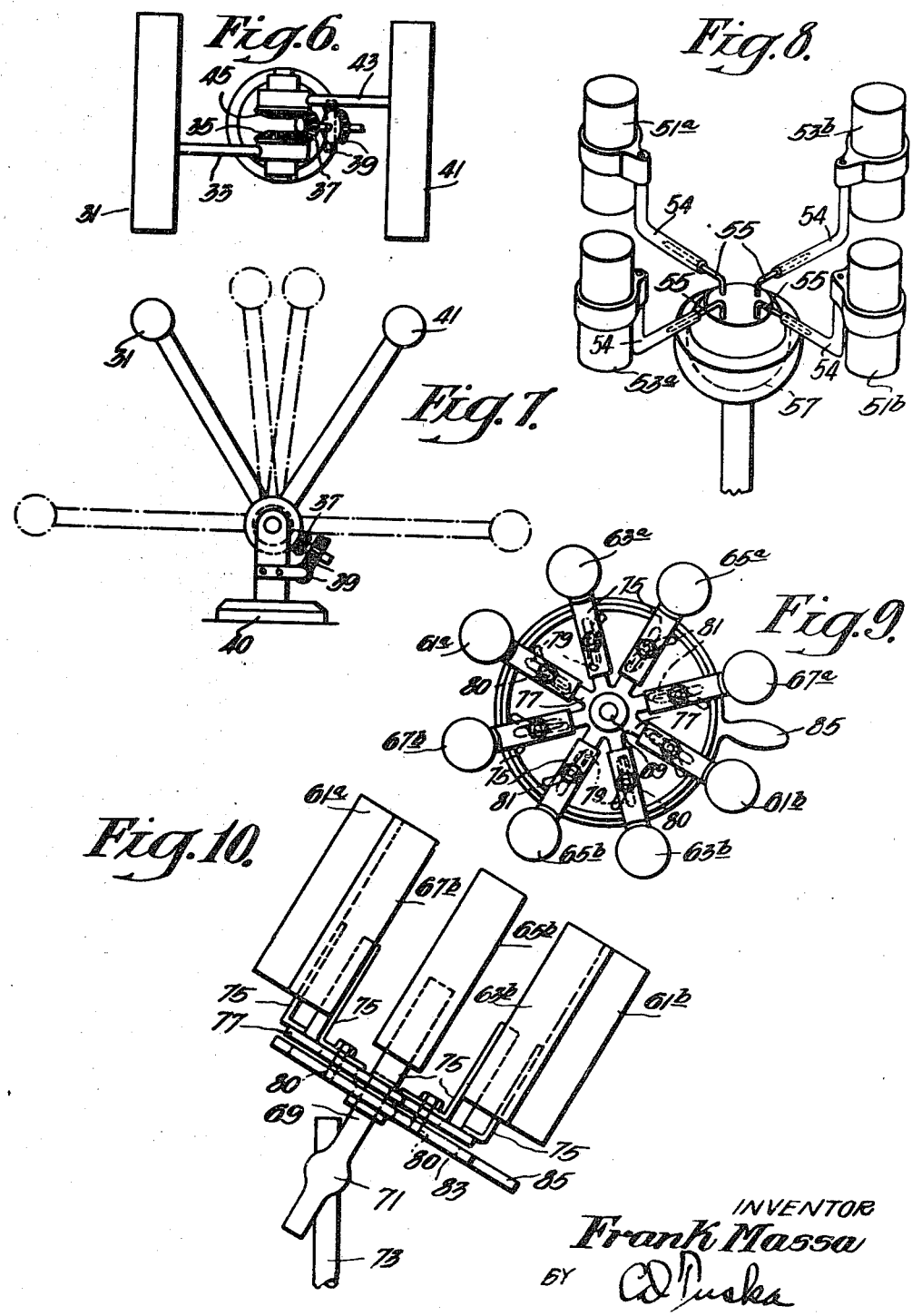
INVENTOR
Frank Massa
BY
ATTORNEY Patented Jan. 21, 1947

2,414,695

UNITED STATES PATENT OFFICE 2,414,695

APPARATUS FOR LOCATING SOUND SOURCES

Frank Massa, Cleveland Heights, Ohio, assignor to Radio Corporation of America, a corporation of Delaware Original application October 31, 1939, Serial No. 302,192. Divided and this application May 1, 1942, Serial No. 441,252

11 Claims. (Cl. 177—352)

This invention relates to apparatus for and a method of locating a sound source, and more particularly to such apparatus and method for locating the position of a sound emitting object with respect to a particular or given point, the present application being a division of my copending application Serial No. 302,192, filed October 31, 1939 for Electroacoustical apparatus and method of using the same.

In my aforesaid copending application, there is disclosed a novel microphone which is responsive to the pressure gradient component of a sound wave, the microphone comprising, generally, a hollow, cylindrical casing closed at each end by a vibratile diaphragm, the two diaphragms being connected by means of a plurality of rods to a voice coil disposed substantially midway of the cylindrical casing in the air gap of a suitable magnetic field structure. The difference in pressure acting on the two diaphragms causes the microphone to operate.

This type of microphone has many fields of application, being particularly useful in the sound detection field for locating a source of sound with respect to a given point. One application for this microphone is to permit a ship to find its way to port through a fog by taking "sonic bearings" on a sound beacon which is set up at a fixed location for the purpose of guiding ships when visibility is low. Another application for my invention is in locating airplanes in flight from the noise generated by the propeller or engine exhaust. For this latter application, the apparatus according to my present invention is much lighter and less bulky than the heavy and cumbersome multiple-horn arrangement heretofore employed.

The primary object of my present invention is to provide an improved apparatus for and method of accurately locating the position of a sound emitting object, whether stationary or moving, relative to a given point.

More particularly, it is an object of my present invention to provide a system as aforesaid which is compact in design, has high sensitivity, and also has high directional selectivity.

Another object of my present invention is to provide an improved sound locating system as aforesaid in which the directional selectivity can be easily controlled.

In accordance with my present invention, I mount one or more of the microphones such as disclosed in my above identified copending application at a given point and orient them relative to a sound source which is to be located until a predetermined response characteristic is obtained. This provides a more or less approximate indication of the location of the sound source. In accordance with a further feature of my present invention, the individual microphones may then be moved or oriented relative to each other in such a manner as to provide a more accurate indication of the location of the sound source for more accurate "spotting" thereof. The combined high sensitivity and high directional selectivity of this improved microphone assembly, together with the compact mechanical structure embodied therein, provides one of the main advantages of my present invention over sound locating devices heretofore known.

The novel features that I consider characteristic of my invention are set forth with particularity in the appended claims. The invention itself, however, both as to its organization and method of operation, as well as additional objects and advantages thereof, will best be understood from the following description, when read in connection with the accompanying drawings, in which Figure 1 is a view showing one way of employing a single microphone of the type disclosed in my above-identified copending application for locating a sound source, Figure 2 is a similar view showing how a pair of such microphones are employed for the same purpose, Figure 3 is a diagrammatic view with reference to which a quantitative analysis is given hereinafter to show how the directional characteristics of the assembly of Fig. 2 vary with spacing and frequency, Figure 4 is a vector diagram showing the voltages induced in each of the microphones shown in Fig. 3, Figure 5 shows a family of characteristic curves pertinent to the system illustrated in Fig. 3, Figure 6 is a plan view of a sound detecting system employing two microphones of the type referred to above, the microphones being so arranged that the distance between their axes may be varied, Figure 7 is an end elevation thereof, Figure 8 is a perspective view of a different assembly employing a plurality of such microphones and arranged for sound detection, Figure 9 is a plan view showing still another arrangement for this purpose, and Figure 10 is a side elevation of the latter form of my invention.

Referring more particularly to the drawings, wherein similar reference characters indicate corresponding parts throughout, I have shown, in Fig. 1, an ultra sensitive, pressure gradient microphone 31 of the type more particularly described and claimed in my aforesaid copending application, the microphone 31 being rotatably mounted at some convenient part of a ship 32 and arranged so that the microphone axis may be varied with respect to the axis of the ship. To take a bearing on the sound source, the microphone 31 is rotated on its support until zero response is indicated. Telephone receivers or electric meters may be employed as an indicator and an amplifier may or may not be provided with the microphone, depending on its sensitivity and degree of precision desired. Fig. 1 shows the microphone oriented to indicate the location of a sound beacon 34, the location of which is to be determined. Angular location may be read from a suitable protractor head 36 assembled on the microphone mounting. Either a manual or automatic means may be provided for turning the microphone 31, and remote control and indicating means may be employed by using flexible shafts or Selsyn motors.

Although the arrangement of Fig. 1 offers a very simple and accurate means for obtaining sonic bearings under certain conditions, it will lose precision if the ship is in the neighborhood of a waterfront having a series of tall buildings which reflect the sound. Under these conditions, it may be practically impossible to get a zero reading for the microphone setting.

An alternative method for detecting a sound beacon is shown in Fig. 2. In this case, two microphones 31 and 41 of the same sensitivity and characteristics are mounted with their axes parallel and separated, and their electrical outputs preferably connected in series, although they may be connected in parallel relation, if desired. Such an arrangement may be made to give a very sharp directional characteristic which permits the location of the sound beacon 34 from the orientation of the microphone assembly which gives an indication of maximum output. The arrangement of Fig. 2 will, in general, be free of reflection errors mentioned above, and, because it operates at maximum output, it requires a less sensitive detecting arrangement than that of Fig. 1; or, for the same detector sensitivity, it may be used at greater distances from the sound source.

In order to permit the proper spacing between microphones, a quantitative analysis will be given to show how the directional characteristics of the microphone combination vary with spacing and frequency. For this purpose, reference is now made to Fig. 3, which shows the two pressure gradient microphones 31 and 41 arranged with their axes parallel and separated by a distance D. A plane wave is shown arriving at an angle $\theta$ with the microphone axes. Both microphones 31 and 41 are assumed to have true "cosine characteristics," as shown by the dotted circles on each microphone, and both microphones are assumed to be of equal sensitivity.

The vector diagram shown in Fig. 4 shows the voltages induced in each microphone, $e_{31}$ and $e_{41}$, and also their sum, $e_0$. From an inspection of Fig. 4, it is obvious that the absolute magnitudes of the voltages $e_{31}$ and $e_{41}$ are equal, and the following relations may be written:

$$|e_{31}| = |e_{41}| = |e_{max}| \cos \theta \qquad (1)$$

The phase angle, $\theta$, between the voltages $e_{31}$ and $e_{41}$ is equal to $$\theta = \frac{D \sin \theta}{\lambda} \times 360° \qquad (2)$$

The voltage $e_0$ in Fig. 4 is equal to $$e_0(\theta=\theta) = \sqrt{|(e_{max})^2| + |(e_{max})^2| + |2(e_{max})^2| \cos \left(\frac{D \sin \theta}{\lambda} \times 360°\right)} \cos \theta \qquad (3)$$

For sound arriving at $\theta = 0°$ $$e_{0(\theta=0)} = 2e_{max} \qquad (4)$$

The directional response characteristic of the combination of microphones is the ratio of Equation 3 over Equation 4 which gives $$\frac{e_{0(\theta=\theta)}}{e_{0(\theta=0)}} = \frac{\sqrt{2 + 2 \cos \left(\frac{D \sin \theta}{\lambda} \times 360°\right)}}{2} \cos \theta \qquad (5)$$

where D=distance between microphone axes, and $\lambda$=wavelength of sound.

Equation 5 shows the directional characteristic of the microphone combination of Fig. 3 as a function of frequency and separation. If D is very small compared to $\lambda$, Equation 5 becomes equal to simply $\cos \theta$, which is the same characteristic as a single microphone. As D is increased, however, the directional characteristic of the combination becomes sharper. The shape of the characteristic for various values of $D/\lambda$ indicated in this figure, and as computed from Equation 5, is shown in Fig. 5. From this information, it is possible to so separate the microphones in Fig. 2 as to obtain any degree of sharpness that is desired for locating the sound beacon 34.

For certain applications, it may be desirable to have the microphones close together to give a broad pick-up characteristic, in which case the sound source may be readily located, and then to separate the microphones for accurate "spotting" of the source. Such an arrangement may be particularly desirable for airplane detection, for example. Several methods may be employed for separating the microphones. For example, they may be mounted on horizontal tracks and displaced thereon as desired, either manually or by auxiliary mechanical means. Another method for varying the microphone separation is shown in Fig. 6. Here, the two microphones 31 and 41 are mounted, respectively, on the supports 33 and 43 which are fixed to a pair of beveled gears 35 and 45 and which may be swung in a fan-shaped manner, as indicated in Fig. 7. In the driving arrangement shown, the two beveled gears 35 and 45, which are arranged on a common axis, are in mesh with a common pinion 37 arranged to drive the gears 35 and 45 in opposite directions, thus keeping the microphone positions at all times symmetrical with respect to the vertical axis. A worm and wheel arrangement 39 may be employed to operate the driving pinion so that the microphones 31 and 41 will remain fixed in any position at which they may be set. Of course, any other mechanical driving arrangement may be employed and braking means provided to keep the microphones from falling under the action of gravity. The complete microphone mounting is preferably fixed to a pivoted base 40 to permit orientation of the structure for determining the angular position of the sound source with respect to some fixed axis of reference.

Fig. 8 shows a schematic representation of the combination of four ultra sensitive pressure gradient microphones such as disclosed in my above noted parent application for the purpose of locating aircraft in flight. Two pairs of microphones 51a, 51b and 53a, 53b are each so arranged that the two sets of microphones may be independently rotated in right angle planes. For this purpose, the four microphones are supported on tubular sleeves 54 which are slidably and rotatably carried on arms 55 secured to the ball member of a ball and socket mounting 57, so that each set may be oriented independently of the other, each to give maximum output indication. The intersection of the two planes, one containing the microphones 51a and 51b and the other containing the microphones 53a and 53b will show the axis along which the airplane is located. Since the sleeves 54 of the two sets of microphones of Fig. 8 are slidably mounted on the arms 55, the separation of each pair of microphones in the plane thereof may then be varied to provide any desired degree of sharpness of location, as noted above. It is obvious that the arrangement of Fig. 8 is preferably operated by two persons, one to locate one and the other to locate the other axis. Each person follows the airplane's progress independently, and the intersecting axes of the two planes of the microphones 51a and 51b, on the one hand, and 53a and 53b, on the other, indicate the airplane's position from instant to instant. It is also obvious, of course, that each pair of microphones may be mounted on a separate universal mounting 57 for independent adjustment.

A modification of the system shown in Fig. 8 which may be operated by one person is shown in Figs. 9 and 10. In this arrangement, a plurality of sets or pairs of microphones 61a, 61b; 63a, 63b; 65a, 65b; and 67a, 67b are shown arranged on a circle around a common shaft or axis 69, the shaft 69 having a universal mounting 71 on a suitable standard 73. The axes of the microphones are all parallel to each other and the outputs of all the microphones (which are of equal sensitivity) are preferably connected in series. Each of the microphones is carried on a bracket 75 slidably carried on a series of diametrically opposed, radial arms 77 on the shaft 69. Each of the brackets 75 has fixed thereto a downwardly extending pin which extends through a slot 79 in its associated arm 77 and also through an associated arcuate slot 81 formed in a disc 83 which is rotatably mounted on the shaft 69 and which is provided with an operating handle 85. As the handle 85 is manipulated to rotate the disc 83, it is obvious that the arcuate slots 81, acting upon the pins 80, will cause the microphones to move radially along the arms 77 within the slot 79 thereof, either toward or away from the shaft 69, depending upon the direction of rotation of the disc 83. It will be noted, however, that all of the microphones remain fixed in regard to their axial parallelism, that is, their respective axes always remain parallel to each other and to the common axis 69. The directional response characteristic of such an arrangement of microphones may be made very sharp with respect to the axis of symmetry 69 by suitable microphone separation by means of the disc 83, and a single person may operate the structure to follow aircraft in flight. The circular arrangement of microphones will permit the "spotting" of an airplane much like a spot-light would be used.

The arrangement of Figs. 9 and 10 may be further modified, if desired, to combine the principles of the modification shown in Fig. 8 with that shown in Figs. 9 and 10. If the mechanical arrangement of the modification of Figs. 9 and 10 is made such that opposite pairs of microphones may be independently connected and moved similar to the arrangement of Fig. 8, it is obvious that the portion of the modification of Figs. 9 and 10 thus employed becomes identical to that shown in Fig. 8. Then, by reconnecting the structures as a unitary arrangement of parallel, circularly disposed elements or microphones, the apparatus is again the "acoustic spot-light" of Figs. 9 and 10.

From the foregoing description, it will be apparent to those skilled in the art that I have provided an improved and simple sound source locating system and method for locating the position or direction of a sound emitting object with great accuracy. Although I have shown and described several embodiments of my invention, it will undoubtedly be apparent to those skilled in the art that there are many other modifications thereof possible, as well as changes in the particular ones herein described and illustrated in the accompanying drawings. It will also be apparent, no doubt, that the microphones herein referred to may be used in many different ways for the purposes set forth, as well as for other purposes. I therefore desire that my invention shall not be limited except insofar as is made necessary by the prior art and by the spirit of the appended claims.

I claim as my invention:

1. In apparatus for locating a sound source, the combination of a support, a plurality of microphones carried by said support in predetermined relation to each other, and means coupled to each of said microphones for simultaneously adjusting all said microphones on said support relative to each other while maintaining said predetermined relation.

2. In apparatus for locating a sound source, the combination of a support, a plurality of microphones carried by said support, said microphones being so disposed on said support that their axes are in parallel relation, and means coupled to each of said microphones for simultaneously adjusting all said microphones on said support relative to each other while so maintaining said microphones that their axes will always remain in parallel relation.

3. Apparatus according to claim 2 characterized in that said microphones are of the pressure gradient responsive type.

4. In apparatus for locating a sound source, the combination of a support, a plurality of microphones carried by said support and so disposed thereon that their axes are in parallel relation, means for orienting said microphones as a unit generally in the direction of a sound source whereby to obtain an approximate indication of the location of said sound source, and means for displacing said microphones relative to each other on said support while maintaining their axes in parallel relation to thereby more accurately locate said sound source.

5. Apparatus according to claim 4 characterized in that said microphones are arranged circumferentially about a common axis.

6. Apparatus according to claim 4 characterized in that said microphones are arranged circumferentially about a common axis, and characterized further in that said microphones are so arranged that diametrically opposite microphones act in pairs.

7. Apparatus according to claim 4 characterized in that said microphones are arranged circumferentially about a common axis which is parallel to the respective microphone axes, and characterized further in that said displacing means is constructed and arranged to move said microphones relative to each other while always maintaining their respective axes parallel to each other and to said common axis.

8. Apparatus according to claim 4 characterized in that said microphones are arranged circumferentially about a common axis which is parallel to the respective microphone axes, and characterized further in that said displacing means is constructed and arranged to move said microphones bodily toward and away from said common axis while always maintaining their respective axes parallel to each other and to said common axis.

9. Apparatus according to claim 4 characterized in that said microphones are arranged circumferentially about a common axis which is parallel to the respective microphone axes, characterized further in that diametrically opposed microphones are arranged to act in pairs, and characterized still further in that said displacing means is constructed and arranged to simultaneously move all said pairs of microphones either radially inwardly toward said common axis or radially outwardly away from said common axis at will.

10. In apparatus for locating a sound source, the combination of a plurality of pairs of microphones arranged circumferentially about a common axis in diametrically opposed relation and with their respective axes parallel to said common axis, diametrically opposed microphones being arranged to act in pairs, and means mounting said microphones for movement of each pair in its own plane separately from the movement of any other pair in the plane of the latter pair.

11. In apparatus for locating a sound source, the combination of a plurality of microphones arranged circumferentially about a common axis in diametrically opposed relation, diametrically opposed microphones being arranged to act in pairs and the axes of the individual microphones of each pair of microphones being parallel to each other, and means mounting said microphones for movement of each pair of microphones with respect to any other of said pairs of microphones.

FRANK MASSA.